United States Patent Office 2,768,175
Patented Oct. 23, 1956

2,768,175

CATALYTIC PROCESS FOR THE CONVERSION OF ISODEHYDROACETIC ESTERS INTO DERIVATIVES OF BETA-METHYL GLUTACONIC ACID

De Walt S. Young and George F. Rodgers, Kingsport, Tenn., assignors to Eastman Kodak Company, Rochester, N. Y., a corporation of New Jersey No Drawing. Application January 29, 1952,
Serial No. 268,931

20 Claims. (Cl. 260—347.3)

This invention relates to the preparation of alpha-substituted derivatives of beta-methyl glutaconic acid according to a new process whereby esters of isodehydroacetic acid are transformed and substituted with an aldehyde residue.

Methods have been described in the prior art for the transformation of beta-methyl glutaconic esters into derivatives of the general type disclosed below; however, so far as is known no prior art exists on the direct conversion of isodehydroacetic acid esters into alpha-substituted beta-methyl glutaconic acid derivatives by a simple direct process which avoids the isolation of intermediate products.

We have now found that a solution of an alkyl ester of isodehydroacetic acid can be refluxed with a basic catalyst or otherwise heated and agitated, followed by the introduction of an aldehyde, and subsequently adding a solution of an additional basic material dissolved in a solvent. The elevated temperature and agitation conditions are continued until the reaction is substantially complete, whereby the salt corresponding to the caustic employed of the desired alpha-substituted beta-methyl glutaconic acid is formed and can be thereupon treated with an acid in order to form the free acid from the salt.

An object of our invention is to describe a procedure whereby esters of isodehydroacetic acid can be converted into alpha-substituted derivatives of beta-methyl glutaconic acid or salts thereof by a new and improved direct process. Another object is to provide a simplified and more economical method for the manufacture of this class of materials which avoids the isolation of intermediate products. Additional objects will become apparent hereinafter.

The alkyl isodehydroacetates which can be employed in accordance with this invention are the lower alkyl esters such as methyl, ethyl, n-butyl, etc., isodehydroacetates; advantageously, those containing from 1 to 6 carbon atoms in the alkyl radical can be employed.

The isodehydroacetic acid ester is dissolved in a lower aliphatic alcohol such as methanol, ethanol, propanol, etc. Advantageously, an alkanol containing from 1 to 6 carbon atoms can be employed. The solution is prepared containing an alkali metal, an alkali metal hydroxide, or an alkali metal alkoxide as a catalyst. The alkali metal alkoxides employed preferably contain alkyl groups corresponding to the lower aliphatic alcohol employed as the solvent; however, the alkyl substituents in the solvent and in the catalysts do not necessarily need to be the same.

Examples of suitable catalysts which can be employed include sodium, potassium, sodium hydroxide, potassium hydroxide, sodium ethoxide, potassium methoxide, etc. The catalyst can be dissolved in the solvent prior to the dissolution of the isodehydroacetic acid ester therein or the two can be dissolved simultaneously or in reverse order. It is preferred to dissolve the catalyst in the solvent and then dissolve the isodehydroacetic acid ester. However, higher and lower proportions of catalysts can also be employed. There is no maximum quantity of the catalyst which can be employed, for example, as much as one mol or more of sodium can be employed per each mol of isodehydroacetic acid ester; however, substantially more than about 5 per cent of the catalysts produces side reactions and results in a reduction in the yields obtained. For this reason it is preferred to keep the concentration of the catalyst below about 5 per cent by weight of the isodehydroacetate. Expressed as a molar percentage, the advantageously employed percentage should not substantially exceed about 15 to 20 percent based on the mols of isodehydroacetate employed.

As pointed out above, it is advantageous to dissolve the catalyst in a quantity of a lower alkyl alcohol and then add the isodehydroacetate. During this phase of the reaction the alcohol is advantageously employed in an amount equal to approximately three to 20 times the molecular proportion of isodehydroacetate. Higher or lower proportions can also be employed. If the solution is quite dilute, correspondingly larger proportions of the catalyst can advantageously be employed.

The mixture of alcohol, catalyst and isodehydroacetate is heated to an elevated temperature with agitation for a a period of time which is advantageously on the order of from one to three hours. It is advantageous to reflux the mixture which simultaneously provides an elevated temperature and agitation.

Following this, the aldehyde is added to the reaction mixture, an excess of an alkali metal hydroxide dissolved in the alcohol is introduced, and the reaction mixture is again heated under an elevated temperature, preferably at reflux, for an additional period of several hours, following which the mixture is cooled and the product in the form of a salt isolated therefrom.

Aldehydes which can be employed in accordance with this invention include any organic compound having the type formula R—CR=O wherein the R substituent can be carbocyclic, heterocyclic, straight chain, or branched chain in nature, i. e., R can be aliphatic, cycloaliphatic, aryl, alkaryl, aralkyl or any other organic radical which does not contain substituents which would interfere with the reaction. Advantageously, a monofunctional aldehyde is employed containing from 1 to 20 carbon atoms in the R substituent which is selected from alkyl, cycloalkyl, alkylcycloalkyl, aryl, aralkyl, alkaryl, furyl, substituted furyl and other analogous heterocyclic and substituted heterocyclic radicals.

Examples of the aldehydes which can be employed in accordance with this invention include benzaldehyde, furfural, isovaleraldehyde, acetaldehyde, caproaldehyde, naphthaldehydes, p-tolualdehyde, cyclohexylaldehyde, cyclohexanecarboxaldehyde, etc.

The quantity of aldehyde consumed in the reaction is in equimolecular proportion to the quantity of isodehydroacetate. It is advantageous to employ a slight excess of the aldehyde, e. g., a 5 percent excess. The amount of aldehyde employed is not critical; however, a slight excess thereof results in better yields.

After the introduction of the aldehyde into the reaction mixture, a solution of alkali metal base such as an alkali metal hydroxide which has been dissolved in an organic solvent is introduced into the reaction mixture. The total quantity of such alkali metal base should be at least 3 times as many mol proportions as the isodehydroacetate employed. Preferably an excess of such alkali metal base is employed, for example, an excess of 25 percent above that theoretically required to form a salt with the glutaconic acid and acetoxy radical resulting from the splitting of the isohydroacetate ester. This can be further illustrated by the following chemical equation whereby the proportions of the reactants which are theoretically required are set forth for the reaction of ethyl isodehydroacetate with benzaldehyde and potassium hydroxide to form the dipotassium salt of alpha-benzal-beta-methyl glutaconic acid, ethyl alcohol, potassium acetate, and water.

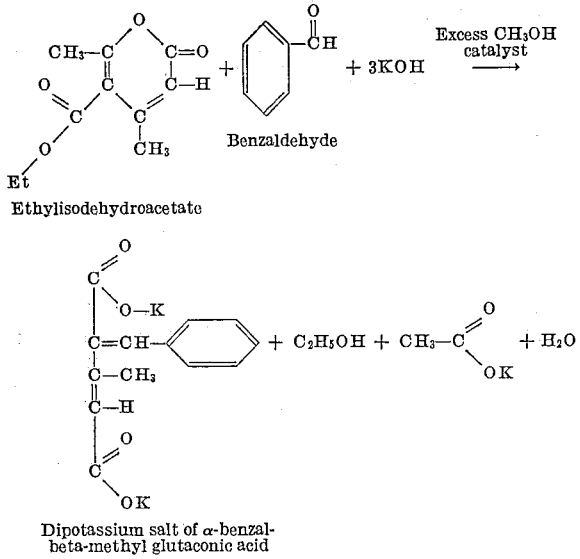

Ethylisodehydroacetate

Dipotassium salt of α-benzal-beta-methyl glutaconic acid

The amount of alcohol employed or other solvent employed in preparing the solution of alkali metal hydroxide varies within wide limits. From about 10 to about 20 mol proportions can advantageously be employed as compared to the mols of isodehydroacetate being reacted. The total amount of alcohol and other solvent, if any, in the reaction mixture at this stage of the reaction can be from about 16 or less to about 40, but preferably no more than about 30 mol proportions.

The alpha-substituted derivatives of beta-methyl glutaconic acid ester prepared in accordance with this invention can advantageously be separated from the reaction mixture by cooling the mixture and allowing it to stand sufficiently to precipitate the salt. The salt can then be advantageously filtered off from the remainder of the reaction mixture. This salt can then be advantageously dissolved in water and acidified with any suitable acid such as hydrochloric acid, sulfuric acid, etc., so as to form the free acid. This method of converting a salt into the free acid is so well known to chemists in general that further details are not believed worthy of extended description.

In order to further illustrate our invention, reference is made to the following examples:

EXAMPLE 1

*Alpha-benzal-beta-methyl glutaconic acid*

As a catalyst, 0.05 gram (0.01 mol proportion) of sodium was dissolved in 60 cc. (7.23 mol proportions) of methanol and 40 grams (1 mol proportion) of ethyl isodehydroacetate was introduced into the solution. The solution was heated under reflux for 90 minutes. This refluxing mixture contained 0.13% by weight of the ethyl isodehydroacetate of the catalyst. Benzaldehyde in the amount of 22 grams (1.03 mol proportions) was added followed by the introduction into the reaction mixture of a solution over a period of 30 minutes of 42 grams (3.68 mol proportions) of potassium hydroxide dissolved in 100 cc. (12.0 mol proportions) of methanol. The reaction mixture was heated under reflux for an additional four hours. It was then cooled and allowed to stand overnight to precipitate the potassium salt of alpha-benzal-beta-methyl glutaconic acid. After filtration and washing with acetone, this salt was dissolved in water and acidified to obtain the corresponding free acid, namely, alpha-benzal-beta-methyl glutaconic acid. The acidification can be accomplished employing hydrochloric acid.

The product was obtained in the amount of 45.5 grams which represents a 96 percent yield. It had a melting point of 186–188° C. (dec.).

EXAMPLE 2

*Alpha-benzal-beta-methyl glutaconic acid*

A quantity of 40 grams of ethyl isodehydroacetate was dissolved in 50 cc. (6 mol proportions) of methanol. A quantity of 42 grams of potassium hydroxide was dissolved in 150 cc. of methanol. Five cc. of the second solution was added to the solution of ethyl isodehydroacetate in methanol and the mixture was refluxed for 90 minutes. This refluxing mixture contained 3.5 percent by weight of the ethyl isodehydroacetate of the catalyst and 6.63 mol proportions of methanol. A quantity of 22 grams of benzaldehyde was then run into the solution followed by the addition of the remainder of the solution of potassium hydroxide in methanol (this solution was introduced gradually over a period of 40 minutes and contained about 17.4 mol proportions of methanol which resulted in a total amount of about 24 mol proportions of methanol). The reaction mixture was then refluxed for a period of four hours and the product was isolated as in Example 1. The yield obtained was 39 grams of crude alpha-benzal-beta-methyl glutaconic acid which represented a yield of 82.5 percent.

It is apparent that the employment of an alkali metal as in Example 1 for the catalyst is superior to the employment of an alkali metal hydroxide as in Example 2; the use of the hydroxide catalyst results in some lowering of the yield obtained.

EXAMPLE 3

*Alpha-isovaleral-beta-methyl glutaconic acid*

A quantity of 40 grams of ethyl isodehydroacetate (1 mol proportion) was dissolved in 60 cc. (7.23 mol proportions) of methanol followed by the addition of 0.05 gram (0.01 mol proportion) of sodium. This solution was then refluxed for 75 minutes. A quantity of 20 grams (1.14 mol proportions) of isovaleraldehyde was added to a solution of 42 grams (3.67 mol proportions) of potassium hydroxide dissolved in 120 cc. (14.5 mol proportions) of methanol was then introduced into the reaction mixture. After refluxing for an additional four hours, the mix was cooled, filtered, and the product was isolated as in Example 1. The yield was 28 grams which represented a 65 percent yield of alpha-isovaleral-beta-methyl glutaconic acid. This product had a melting point of 149–151° C. (dec., corr.). Upon recrystallization from an aqueous methanol solution, the melting point was raised to 158–161° C. (dec., corr.).

EXAMPLE 4

*Alpha-furfural-beta-methyl glutaconic acid*

A quantity consisting of 40 grams (1 mol proportion) of ethyl isodehydroacetate, 20 grams of furfural (1.02 mol proportions), 42 grams (3.68 mol proportions) of potassium hydroxide and 120 cc. (14.46 mol proportions) of methanol were reacted in a manner similar to that described in Example 2. A yield of 40 grams of alpha-furfural-beta-methyl glutaconic acid was obtained which represents a yield of 88 percent. The melting point of this product was 204–205° C. (dec., corr.). Upon recrystallization from a 25 percent methanol solution, the melting point was 205–208° C. (dec., corr.).

Since the catalytic materials employed in accordance with the above description are bases or base-forming materials, the presence of acids must be avoided during the course of the reaction. The above examples are illustrative of the process of this invention but the conditions and the proportions of ingredients can be varied considerably, as indicated hereinbefore.

Other aldehydes, esters of isodehydroacetic acid, catalysts, and alkali metal bases can be employed to produce compounds corresponding to such reactants as are employed. Thus, propyl isodehydroacetate can be reacted with butyraldehyde employing potassium as the catalyst and sodium hydroxide as the alkali metal salt forming agent and ethyl alcohol as the solvent instead of methyl alcohol whereby the disodium salt of alpha-butyral-beta-methyl glutaconic acid can be prepared. This salt can then be converted into the free acid treatment with aqueous sulfuric acid. Similarly, n-butyl isodehydroacetate can be reacted with cyclohexanecarboxaldehyde employing sodium hydroxide both as the catalyst and salt-forming agent and n-propyl alcohol as the solvent whereby the disodium salt of alpha-cyclohexamethylidene-beta-methyl glutaconic acid can be formed.

The products prepared in accordance with this invention are valuable intermediates in organic synthesis. Through use of this invention it is no longer necessary to isolate and purify beta-methyl glutaconic acid esters prior to preparing the above-described derivatives thereof. Thus, greater economy of time, chemicals, and equipment is thereby made possible.

What we claim as our invention and desire to secure by Letters Patent of the United States is:

1. A process for preparing an alpha-substituted R—CH=beta-methyl glutaconic acid salt which comprises heating about one mol proportion of lower alkyl ester of isodehydroacetic acid in a solution consisting of a catalytic quantity of an alkali metal containing catalyst selected from the group consisting of the alkali metals, alkali metal hydroxides and alkali metal alkoxides dissolved in from about 3 to about 20 mol proportions of a lower alpihatic alcohol, then adding about one mol proportion of an aldehyde having the formula R—CH=O wherein R is a radical containing from 1 to 10 carbon atoms selected from the group consisting of alkyl, aryl, aralkyl, alkaryl, and furyl radicals, and subsequently adding a solution containing about three mol proportions of an alkali metal base as a salt forming agent dissolved in an inert organic solvent, the reaction being conducted at a temperature of from about 50° C. to and including reflux temperature.

2. A process as defined in claim 1 wherein the aldehyde is employed in excess of one mol proportion.

3. A process as defined in claim 2 wherein the alkali metal base employed as a salt forming agent is an alkali metal hydroxide employed in excess of three mol proportions.

4. A process as defined in claim 3 wherein the inert organic solvent for the salt forming agent is employed in a quantity sufficient to bring the total quantity of such solvent together with the lower aliphatic alcohol up to from about 16 to about 30 mol proportions.

5. A process as defined in claim 4 wherein the inert organic solvent for the salt forming agent is a lower aliphatic alcohol.

6. A process as defined in claim 5 wherein the aliphatic alcohol is methanol.

7. A process as defined in claim 6 wherein the alkyl isodehydroacetate is the ethyl ester.

8. A process as defined in claim 7 wherein the catalyst is employed to an extent of from 0.1 percent to about 5 percent by weight of the ethyl isodehydroacetate.

9. A process as defined in claim 8 wherein the catalyst is sodium.

10. A process for preparing an alpha-substituted R—CH= derivative of a beta-methyl glutaconic acid salt which comprises heating about one mol proportion of a lower alkyl ester of isodehydroacetic acid containing from 1 to 6 carbon atoms in the alkyl group in a solution consisting of from about 0.1% to about 5% by weight of the isodehydroacetic acid ester of an alkali metal containing catalyst selected from the group consisting of the alkali metals, the alkali metal hydroxides and the alkali metal alkoxides dissolved in from about 3 to about 20 mol proportions of a lower aliphatic alcohol, then adding about one mol proportion of an aldehyde having the formula R—CH=O wherein R is a radical containing from 1 to 10 carbon atoms selected from the group consisting of alkyl, aryl, aralkyl, and furyl radicals, and subsequently adding a solution containing in excess of three mol proportions of an alkali metal hydroxide as a salt forming agent dissolved in the same lower aliphatic alcohol employed as a solvent for the catalyst solution, the reaction being conducted at a temperature of from about 50° C. to and including reflux temperature.

11. A process as defined in claim 10 wherein ethyl isodehydroacetate, methyl alcohol, potassium hydroxide as the catalyst and salt forming agent, and benzaldehyde as the aldehyde are employed, the reaction being conducted at reflux temperature.

12. A process as defined in claim 10 wherein ethyl isodehydroacetate, methyl alcohol, sodium as the catalyst, isovaleraldehyde as the aldehyde, and potassium hydroxide as the salt forming agent are employed, the reaction being conducted at reflux temperature.

13. A process as defined in claim 10 wherein ethyl isodehydroacetate, methyl alcohol, potassium hydroxide as the catalyst and salt forming agent, and furfural as the aldehyde are employed, the reaction being conducted at reflux temperature.

14. A process as defined in claim 10 wherein ethyl isodehydroacetate is employed.

15. A process as defined in claim 14 wherein methyl alcohol is employed as the solvent.

16. A process as defined in claim 15 wherein sodium as the catalyst is employed.

17. A process as defined in claim 16 wherein benzaldehyde as the aldehyde is employed.

18. A process as defined in claim 17 wherein the reaction is conducted at reflux temperature.

19. A process as defined in claim 18 wherein potassium hydroxide is employed as the salt forming agent.

20. A process for preparing an alpha-substituted R—CH= derivative of beta-methyl glutaconic acid which comprises heating at a temperature of from about 50° C. to and including reflux temperature about one mol proportion of a lower alkyl ester of isodehydroacetic acid containing from 1 to 6 carbon atoms in the alkyl group in a solution consisting of from about 0.1 percent to about 5 percent by weight of the isodehydroacetic acid ester of an alkali metal containing catalyst selected from the group consisting of the alkali metals, the alkali metal hydroxides and the alkali metal alkoxides dissolved in from about 3 to about 20 mol proportions of a lower aliphatic alcohol, then adding about one mol proportion of an aldehyde having the formula R—CH=O wherein R is a radical containing from 1 to 10 carbon atoms selected from the group consisting of alkyl, aryl, aralkyl, and furyl radicals, subsequently adding a solution containing in excess of three mol proportions of an alkali metal hydroxide as a salt forming agent dissolved in the same lower aliphatic alcohol employed as a solvent for the catalyst solution, allowing the reaction mixture to cool, separating the alpha-substituted derivative of a beta-methyl glutaconic acid salt which is formed, dissolving this salt in water and acidifying this solution to form an alpha-substituted R—CH= derivative of beta-methyl glutaconic acid.

References Cited in the file of this patent

Grant: Hackh's Chemical Dictionary, 3rd ed., page 32 (1944).